United States Patent [19]

Nakagawa et al.

[11] Patent Number: 5,316,513
[45] Date of Patent: May 31, 1994

[54] ELECTROTHERMAL COLOR-VARYING DEVICE AND TOY UTILIZING THE SAME

[75] Inventors: Tanehiro Nakagawa, Nagoya; Yoshiaki Ono, Gifu; Tsutomu Tomatsu; Takeo Yamaguchi, both of Nagoya; Kyoji Aoyama, Aichi; Toshiaki Tanaka, Yokkaichi, all of Japan

[73] Assignee: The Pilot Ink Co., Ltd., Nagoya, Japan

[21] Appl. No.: 107,907

[22] Filed: Aug. 18, 1993

Related U.S. Application Data

[63] Continuation of Ser. No. 750,244, Aug. 27, 1991, abandoned.

[30] Foreign Application Priority Data

| Aug. 31, 1990 | [JP] | Japan | 2-231050 |
| Oct. 12, 1990 | [JP] | Japan | 2-107362[U] |
| Nov. 18, 1990 | [JP] | Japan | 2-120360[U] |
| Jun. 26, 1991 | [JP] | Japan | 3-57671[U] |
| Jun. 26, 1991 | [JP] | Japan | 3-183052 |

[51] Int. Cl.⁵ .................... A63H 33/00; A63H 29/22; A63H 33/22
[52] U.S. Cl. ........................ 446/14; 446/484; 446/219
[58] Field of Search ......... 106/21, 499; 252/623; 446/14, 484, 485, 219, 175

[56] References Cited

U.S. PATENT DOCUMENTS

| 1,592,148 | 7/1926 | Munn . | |
| 4,028,118 | 6/1977 | Nakasuji et al. . | |
| 4,176,273 | 11/1979 | Fujie . | |
| 4,305,223 | 12/1981 | Ho | 446/484 X |
| 4,384,989 | 5/1983 | Kamgaito et al. | 252/62.3 BT X |
| 4,421,560 | 12/1983 | Kito et al. | 106/21 |
| 4,720,301 | 1/1988 | Kito et al. | 106/21 |
| 4,725,462 | 2/1988 | Kimura . | |
| 4,818,215 | 4/1989 | Taga | 446/14 X |
| 4,917,643 | 4/1990 | Hippely . | |
| 4,920,991 | 5/1990 | Shibahashi et al. . | |
| 5,011,445 | 4/1991 | Nakasuji et al. . | |
| 5,079,049 | 1/1992 | Kito et al. . | |
| 5,085,607 | 2/1992 | Shibahashi et al. | 446/14 |
| 5,139,454 | 8/1992 | Earnest | 446/14 |

FOREIGN PATENT DOCUMENTS

| 0473446 | 3/1992 | European Pat. Off. | 446/484 |
| 47-25955 | 7/1972 | Japan | 252/62 BBT |
| 4109986 | 4/1992 | Japan | 446/484 |
| 8810139 | 12/1988 | PCT Int'l Appl. | 446/14 |
| 8908486 | 9/1989 | PCT Int'l Appl. | 446/14 |
| 1389801 | 4/1988 | U.S.S.R. | 446/484 |
| 2066089 | 7/1981 | United Kingdom | 446/485 |
| 2205255 | 12/1988 | United Kingdom | 446/14 |

Primary Examiner—D. Neal Muir
Attorney, Agent, or Firm—Fitzpatrick, Cella, Harper & Scinto

[57] ABSTRACT

There is disclosed an electrothermal color-varying device inducing color change in a thermally color-varying layer by heat generation in an electrothermal heat-generating member, in which the heat-generating member is composed of a non-metallic member having a positive temperature coefficient on the electric resistance at least in a temperature range 25° C. to 65° C. and a particular volume resistivity, is adapted to generate heat by the application of a low voltage and is capable of self-control of the saturated heating temperature at an arbitrary temperature within a range of 25° C. to 65° C., whereby improved safety is achieved without the danger of overheating or current leakage. Also there are disclosed toys utilizing such color-varying device.

5 Claims, 8 Drawing Sheets

ELECTROTHERMAL COLOR-VARYING DEVICE AND TOY UTILIZING THE SAME

This application is a continuation-in-part continuation of U.S. application Ser. No. 07/750,244, filed Aug. 27, 1991, now abandoned.

BACKGROUND OF THE INVENTION

1. Field of the Invention

The present invention relates to an electrothermal color-varying device, and more particularly such device of higher safety, capable of rapid heat generation in a heat generating member to a predetermined temperature by the application of a low voltage, thereby inducing a visible color change in a thermal color-varying layer, wherein the generated temperature is self-controlled to avoid danger resulting from overheating.

2. Related Background Art

There are already proposed, for example in the Japanese Laid-open Utility Model No. 62-137093 and the Japanese Laid-open Patent No. 62-201178, color-varying toys in which a color change in a color-varying layer is induced by current supply to an electrically energizable heat-generating member positioned behind said color-varying layer.

The heat-generating member in such proposals in a heater composed of a metal wiring capable of heat generation by current supply, such as tungsten, nickel or titanium, and an insulating ceramic material covering said metal wiring.

The heat-generating member employed in the above-mentioned conventional color-varying toys lacks the temperature self-controlling ability required for proper function in a desired temperature range, thereby involving danger of overheating and requiring therefore a temperature control switch or the like, and also necessitates insulation such as a ceramic covering in order to avoid danger of current leakage.

SUMMARY OF THE INVENTION

The object of the present invention is to provide a novel electrothermal color-varying device, capable of providing increased safety free from overheating or current leakage in the conventional structure, rapid heat generation in the heat generating member so a predetermined temperature by the application of a low voltage thereby inducing a visible color change in the color-varying layer, temperature self-control function at a preset temperature thereby avoiding the danger of overheating, and a reduced temperature fluctuation in the heat generating member resulting from a change in the ambient temperature thereby realizing effective color change in the thermal color-varying layer, and a toy utilizing such color-varying device.

BRIEF DESCRIPTION OF THE DRAWINGS

FIGS. 9 to 12 are charts showing characteristics of the heat-generating element adapted for use in the electrothermal color-varying device of the present invention, whereby

FIGS. 15 to 21 are views showing toys employing the electrothermal color-varying device of the present invention, wherein:

DESCRIPTION OF THE PREFERRED EMBODIMENTS

Now the present invention will be clarified in greater detail by preferred embodiments shown in the attached drawings.

The electrothermal color-varying device 1 of the present invention is provided with an electrothermal heat-generating element 2 and a thermally color-varying layer 3 positioned in contact with or in proximity to said heat-generating element 2 wherein said color varying layer 3 is rendered capable of color change by current supply to said heat-generating element 2, wherein said electrothermal heat-generating element 2 is composed of a thermistor which (i) has a positive temperature coefficient on the electrical resistance at least in a temperature range of 25°–65° C. and a steep increase of resistance with increase in temperature, whereby the amount of generated heat decreases with the increase in resistance to enable self-control of temperature, (ii) has a volume resistivity at 25° C. ($\rho_{25}$) in a range of $9.8 \times 10^{-3}$ to $2.97 \times 10^5$ Ω·cm, and (iii) has a ratio $\rho_{65}/\rho_{25}$ of volume resistivity at 65° C. to that at 25° C. satisfying a condition $5 \leq \rho_{65}/\rho_{25} \leq 200$, and which generates heat by the application of a voltage of 0.8–40 V, and is capable of temperature self-control at an arbitrary saturation temperature within a range of 25°–65° C.

Under such conditions, the heat-generating element 2 is practical for use in a toy or for educational purpose, with an area of about 0.05 to 20 cm² (area of one side) and a thickness of 0.05 to 1 cm, preferably not exceeding 0.5 cm. An element of a smaller area is inadequate for use in a toy because of limited color-varying effect, while an element of large area and volume is undesirable in terms of heat-generating ability, heat-generating efficiency and uniformity of heat within a short time under a low voltage application.

More specifically, the heat-generating element 2 can be composed, for example, of a sintered material based on BaTiO₃ (rendered semiconductive by doping with a rare earth element, followed eventually by substitution with another element such as Sr), a monocrystalline material based on Si, or an organic plastic material (conductive fine powder such as graphite blended in crystalline low-melting plastic), among which the sintered material based on $BaTiO_3$ is preferred in consideration of adjustability of saturation heating temperature in the low temperature range (25°-65°) and temperature elevation characteristics.

The heat generating element 2 may be shaped as a disk, a belt, a honeycomb-form or other suitable forms according to the purpose.

In the following there will be explained the characteristics of the electrothermal heat-generating element 2 adapted for use in the present invention, with reference to charts shown in FIGS. 9 to 12.

The heat-generating element 2 is required to have a positive temperature coefficient on the electrical resistance at least in a range of 25° to 65° C., and to have a steep increase of resistance with increase in temperature (FIG. 9), whereby the amount of generated heat decreases with the increase in resistance to enable self-control of temperature.

Furthermore, the heat-generating element 2 is required to have a volume resistivity at 25° C. ($\rho_{25}$) within a range of $9.8 \times 10^{-3}$ to $2.97 \times 10^5$ Ω·cm, or, more detailedly, a volume resistivity ($\rho$) at different temperatures within upper and lower limits shown in FIG. 10, and a ratio $\rho_{65}/\rho_{25}$ of the volume resistivity at 65° C. to that at 25° C. within a range $5 \leq \rho_{65}/\rho_{25} \leq 200$.

These conditions allow to provide a heat-generating element 2 having heat generating characteristics in the low temperature range (not exceeding 65° C., preferably not exceeding 50° C.) and temperature self-controlling ability, required for use in a toy or an educational application. If the volume resistivity of the heat generating element 2 is above the upper limit, the temperature cannot be elevated to a desired value within a short time unless the voltage is elevated, while, if the volume resistivity is below the lower limit, the desired temperature cannot be obtained unless a large current is supplied with an extremely low voltage, so that these cases are unpractical for use in a toy.

Figure 8:
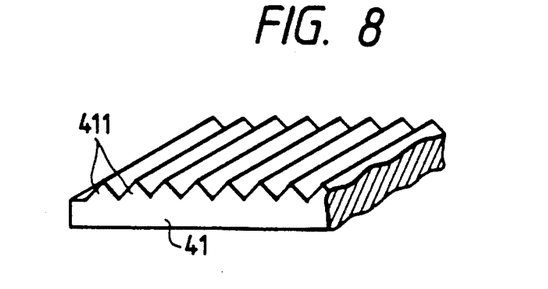
FIG. 8 is a partially cut perspective view of a metal heat releasing of FIG. 7.
Figure 9:
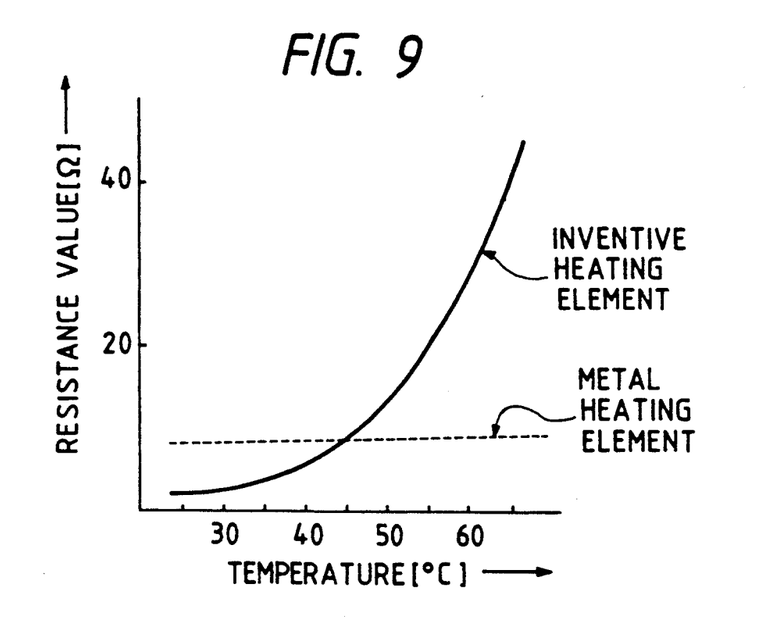
FIG. 9 shows resistance-temperature relationship.
Figure 10:
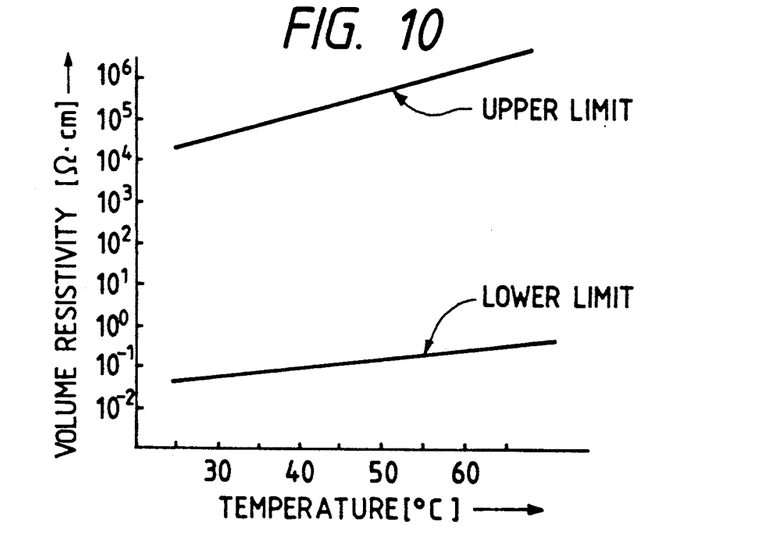
FIG. 10 shows tolerance of volume resistivity at different temperatures.
Figure 11:
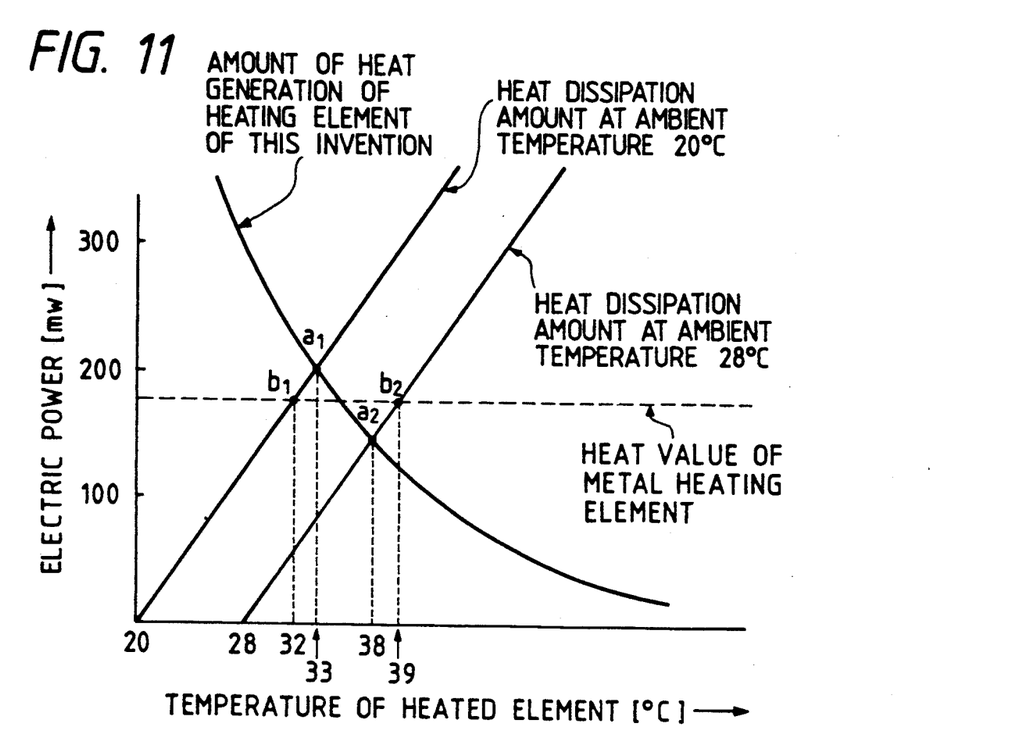
FIG. 11 shows a stable temperature of the heat-generating element at different ambient temperatures.
Figure 12:
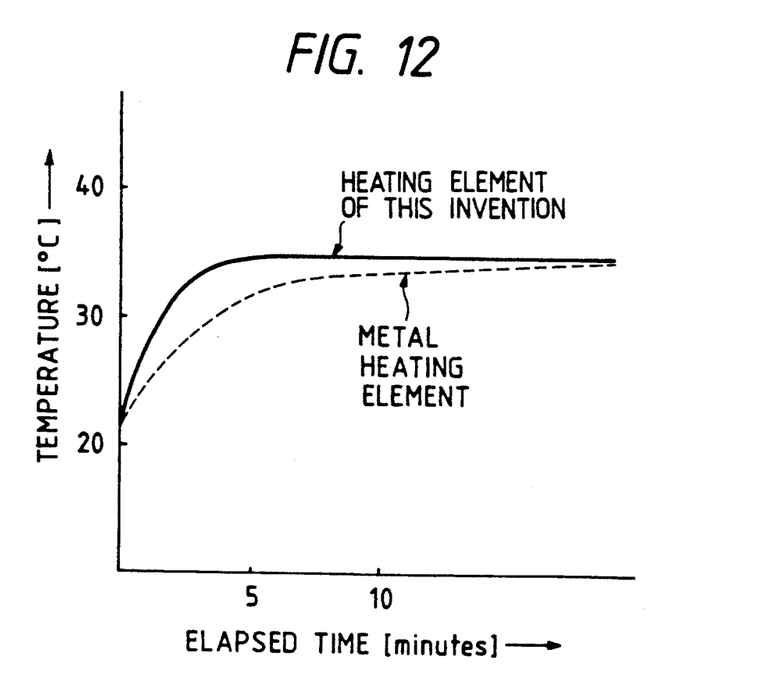
FIG. 12 shows relationship between the temperature of heat-generating element and elapsed energizing time.

FIG. 11 shows the relationship between the stable temperature of heat generating element and the ambient temperature. A heated member stays at a temperature where the amount of heat generation of the heat generating element per unit time coincides with the amount of heat dissipation per unit time, and the heat generating element 2 of the present invention shows stabler thermal characteristics, with less influence of ambient temperature, in comparison with a metal heat generating element. FIG. 8 shows the relationship between the generated temperature of the heat generating element and the energizing time thereof.

In the foregoing experimental data, the heat generating element 2 was composed of a BaTiO₃ sintered material (15.0 mm in diameter × 1 mm in thickness; 2.5 Ω(25° C.)), while the metal heat generating element was composed of a titanium wiring formed on a polyester film of a thickness of 0.1 mm, each fixed on a brass plate of an area of 30×30 mm and a thickness of 0.3 mm and supplied with a voltage of 1 V.

The heat generating element 2 is preferably provided with electrodes 5 in consideration of the mounting structure for current supply. More specifically, said electrodes may be formed on mutually opposed faces of the heat generating element 2 by molten aluminum injection or nickel plating, or on a heat conductive substrate 41 such as a heat conductive plate to be positioned in contact with said heat generating element 2. Lead wires 6 are connected to said electrodes 5 in order to enable power supply from a power source. The power source may be composed of various batteries or an AC power source of a voltage regulated by a transformer, and may be so designed as to apply a voltage in a range of 0.8 –40 V.

Figure 7:
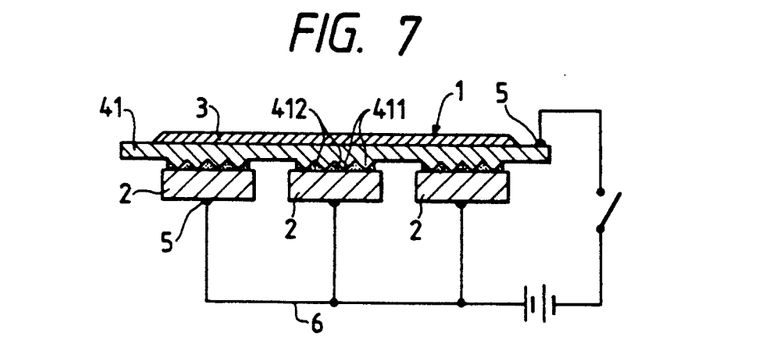

The above-mentioned heat conductive member 41 provides the advantages of ease of electrode setting, uniform heating of the heat generating element 2, and expansion and transmission of the generated heat by the element 2 to a larger area. The heat conductive member 41 and the heat generating element 2 are generally used in mutually contacted or adhered state (cf. FIGS. 1 to 5). It is also possible to adhere both members, as shown in FIGS. 7 and 8, by forming plural V-shaped grooves on the heat conductive member 41 opposed to the heat generating element 2 and injecting cyanoacrylate adhesive while the protruding portions are maintained in contact with the heat generating element 2.

In case the heat conductive member 41 is composed of a metal foil such as of aluminum, copper or brass, a foil with slits thereon can be effectively used and may be itself utilized as a heat generating member, by connection with the electrothermal heat-generating element 2.

In the following there will be explained the thermal color-varying layer 3.

Said thermal color-varying layer 3 can be composed of a known material showing reversible thermal color change, such as cholesteric liquid crystal, a three-component thermal color-varying material consisting of an electron-donating color-forming organic compound, a color developing agent for said compound and a compound capable of reversibly inducing a coloring reaction between the above-mentioned two components, or microcapsules or solid resinous particles containing the above-mentioned components, and is preferably composed of thermal color-varying materials disclosed in the U.S. Pat. Nos. 4,028,118, 4,732,810 and 4,865,648 of the same assignee.

The above-mentioned three-component thermal color varying material causes reversible color change at a certain temperature, but, depending on the three components, there is generated a specific hysteresis in the color change between a temperature change from low temperature to high temperature and a temperature change from high to low temperature.

The thermal color-varying material adapted for use in the present invention is not limited as long as it is capable of generating color change by the selected electrothermal heat generating element. The above-mentioned hysteresis may be suitably utilized for obtaining diversified variations in the change or restoration of color at the descent of temperature, after color change is induced in the color-varying layer by the heat generation in the heat-generating element. More specifically, if the width of hysteresis is significantly large (7°-50° C.), after the termination of current supply, diversified variations can be obtained at the room temperature. On the other hand, if said width is narrow (3° C. or less), sharper color change or restoration can be obtained after the current supply is terminated. Also in case of an intermediate hysteresis, the color change or restoration can be obtained with a suitable time delay with the temperature descent of the heat generating member, after the termination of current supply. Such hysteresis may be suitably selected according to the method of use of the toy incorporating such electrothermal color-varying device.

The above-mentioned thermal color-varying material may be dispersed in a suitable vehicle to obtain ink or paint usable for forming a thermal color-varying layer in desired places, or blended in thermoplastic resin for forming a sheet-shaped thermal color-varying layer.

The electrothermal color-varying device 1 of the present invention may naturally be constructed as an independent unit and mounted on the main body of a toy. There may also be effectively employed configurations in which a substrate 4 in contact with the heat generating element 2 is a constituent of the toy and bears the thermal color-varying layer 3 thereon, or in which the heat is transmitted through the heat conductive member 41 to a sheet or a film, constituting the toy, bearing the color-varying layer 3 thereon.

Also the power source may be integrally incorporated in the electrothermal heat-generating device 1 itself, or mounted in the main body of the toy, or provided outside the toy to enable remote control.

In the above-explained structures, a voltage application through the lead wires 6 causes heat generation by the heat-generating element 2 connected thereto, thereby inducing color change in the thermal color-varying layer 3 provided on said heat-generating element 2 or on the substrate 4 maintained in contact with in proximity of said heat-generating element 2.

In response to the voltage application, the heat-generating element 2 shows a temperature increase by heat generation, with a rapid increase in the resistance. Thus the rate of temperature elevation gradually decreases, whereby the temperature is self-controlled at a point where the amount of heat generation coincides with the amount of heat dissipation (cf. FIG. 11).

In the relationship between the generated temperature and the energizing time, the metal heat-generating element shows slow temperature elevation because of a substantially constant amount of heat generation per unit time, based on an extremely small temperature-dependent change of resistance, whereas the electrothermal heat generating element 2 of the present invention shows a large current to provide a large temperature elevation rate immediately after the start of energization, thereby rapidly reaching the desired temperature.

With regards to the change in ambient temperature, the electrothermal heat-generating element 2 stabilizes at about 33° C. or about 38° C. respectively at an ambient temperature of 20° C. or 28° C. with a temperature difference of about 5° C. On the other hand, the metal heat-generating element, because of small temperature-dependent change in amount of heat generation per unit time, stabilizes at about 32° C. or about 39° C., respectively at an ambient temperature of 20° or 28° C., with a temperature difference of 7° C.

Consequently, the electrothermal heat-generating element 2 of the present invention shows a smaller temperature change, by the influence of ambient temperature, than in the metal heat-generating element.

The electrothermal heat-generating element 2 satisfying the aforementioned conditions (i), (ii) and (iii) exhibits the above-explained behaviors by the application of a low voltage (0.8–40 V), and performs temperature self-controlling function in a low temperature range (not exceeding 65° C.), thereby realizing desired thermal characteristics.

The thermal color-varying layer 3, being positioned in contact with or in proximity to the electrothermal heat-generating element 2, exhibits color change in rapid response to the heat generated by the heat-generating element 2.

Also diversified variations can be obtained according to the hysteresis of the thermal color-varying material.

Figure 13:
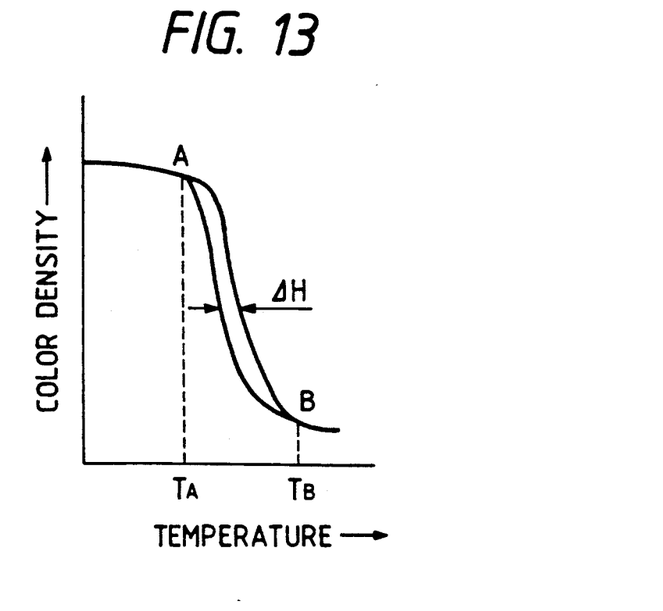
FIGS. 13 and 14 are charts showing temperature-dependent hysteresis in color density, respectively of color-varying materials of a small hysteresis and a large hysteresis, adapted for constituting the color-varying layer.

A system employing a thermal color-varying material with a very small width ($\Delta H$) of hysteresis (cf. FIG. 13) responds sharply at a predetermined temperature, and shows visually different appearances on both sides of the color varying point.

Figure 14:
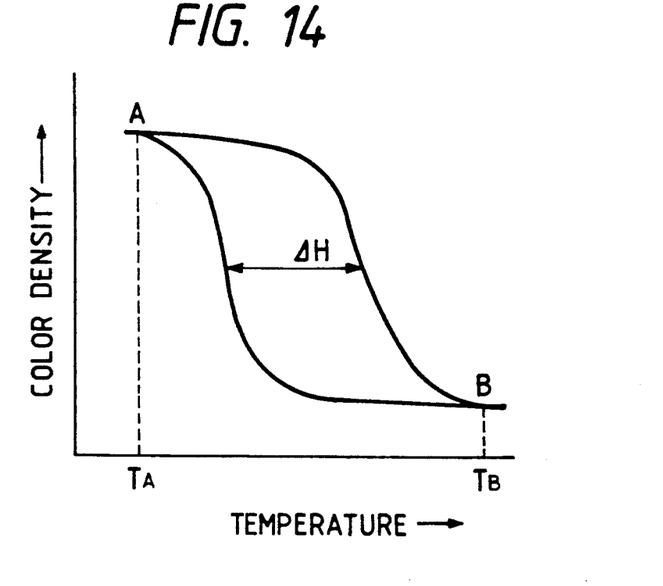

When the heat-generating element 2 is maintained at a temperature beyond the color-varying point, a varied color is maintained and observed, but, when the temperature of said element is lowered to the color varying point or lower, the varied color is no longer maintained and the system returns to the appearance at normal temperature. On the other hand, in a system employing a thermal color-varying material with a large width ($\Delta H$) of hysteresis (cf. FIG. 14), the color changed at a heating temperature $T_B$ is maintained even when the temperature becomes lower than said heating temperature and is observed at the normal temperature range. Also when the color varying layer is cooled to a temperature $T_A$ or lower, the color before said change is restored, and is maintained and observed at the normal temperature range.

Also in a system with the afore-mentioned intermediate hysteresis, the change or restoration of color can be realized with a suitable delay along with the descent of temperature of the heat-generating element after the termination of power supply.

EXAMPLE 1

Figure 1:
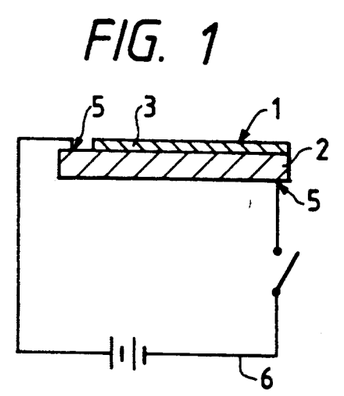
FIGS. 1 to 5 and 7 are vertical cross-sectional views showing embodiments of the electrothermal color-varying device of the present invention.
Figure 2:
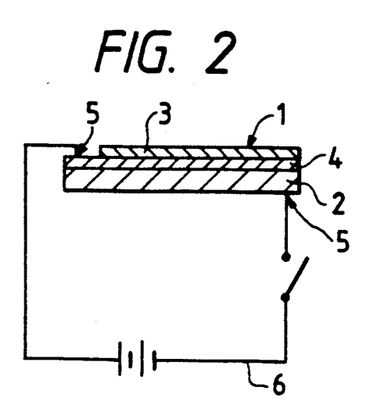

In the following there will be explained an embodiment of the electrochemical heat-generating device shown in FIG. 2, applied to the eyes of a doll.

The heat-generating element 2 was composed of sintered $BaTiO_3$ (5 mm in diameter, thickness 1 mm, 2.0 $\Omega$) bearing conductive plated layers on both sides, and a heat-conductive substrate 4 consisting of an aluminum of a thickness of 0.1 mm was integrally adhered by a conductive adhesive material to a side of said heat-generating element 2. The saturation temperature of the heat-generating element 2 was set at about 40° C. An electrode 5 consisting of other conductive plated layer of the heat-generating element 2 and another electrode 5 formed on the opposed conductive substrate 4 were connected through lead wires 6 to a battery of 1.5 V.

The thermal color-varying layer 3 was formed on said heat-conductive substrate 4. More specifically, eyes of a doll were printed with ordinary pale-blue printing ink, and were superposedly printed with a material containing a thermal color-varying material which is brown at a temperature lower than 40° C. but changes colorless at 40° C. or higher, with $\Delta H$ of 1° C.

When the above-explained structure was energized, the eyes which were brown at room temperature changed to pale blue after about 30 seconds. Depending on the variation in the ambient temperature or in the temperature of the heat-generating element 2, the eys showed reversible changes between brown and pale blue colors.

EXAMPLE 2

Figure 3:
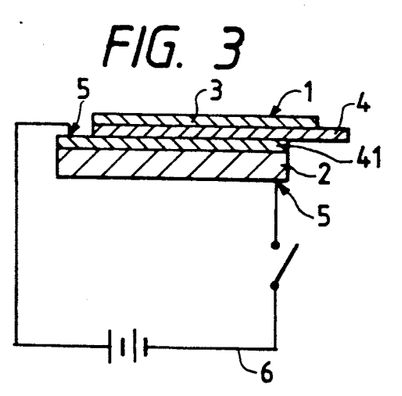
Figure 17:
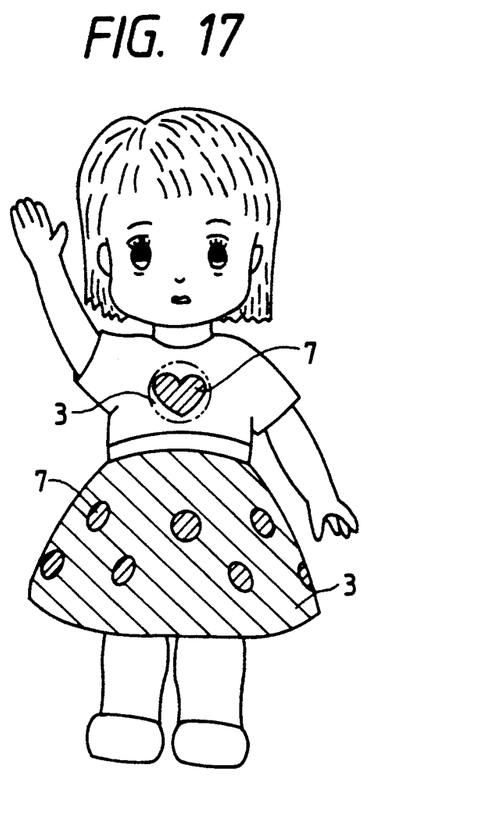
FIG. 17 is an external view of a doll with color-varying parts.

In the following there will be explained an embodiment of the electrothermal color-varying device 1 shown in FIG. 3, applied to a toy robot shown in FIG. 17.

In the belly part of a toy robot, there was suitably mounted a device 1 consisting of a sheet substrate 4 bearing a thermal color-varying layer 3 and a heat-generating element composed of sintered $BaTiO_3$ (15 mm in diameter, thickness 1 mm, 20 Ω, saturation temperature about 40° C.) laminated on the rear face of said sheet 4 and having a power source composed of two batteries of 1.5 V.

The top surface of said sheet 4 was printed with a pale-pink heart pattern (non-color-varying layer 7), which was covered by a material containing a thermal color-varying material which was dark blue at a temperature lower than 40° C. but capable of changing to colorless at 40° C. or higher, with ΔH of 5° C.

The belly of said toy robot was dark blue at room temperature, but showed a pale-pink heart pattern after about 30 seconds from the start of energization.

EXAMPLE 3

Figure 4:
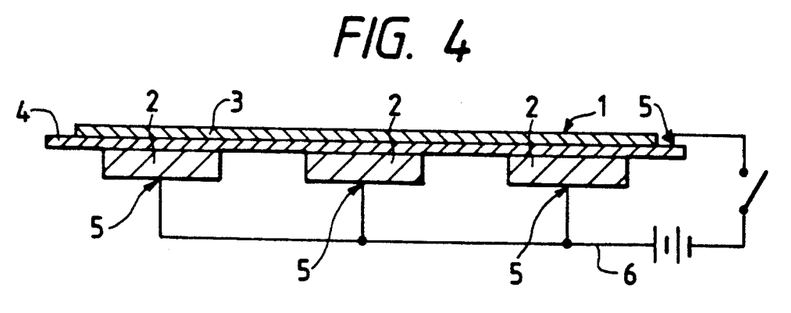

In the following explained is an embodiment of the electrothermal color-varying device 1 shown in FIG. 4, applied to a miniature car.

On a brass body, with a thickness of 0.3 mm, of a miniature car, heat-generating elements 2 of sintered $BaTiO_3$ (7 mm in diameter, thickness 1 mm, 3 Ω, saturation temperature about 36° C.) were adhered with a conductive adhesive material on the roof, engine hood and tail portions. Electrodes 5 on the rear side of said heat-generating elements were connected by a lead wire 6, which was further connected to a power source (about 3 V), of which the other terminal was connected through another lead wire 6 to an electrode formed on the body, which serves as the conductive substrate 41.

On said body 41 there was formed a thermal color-varying layer 3 by spray coating of paint containing a thermal color-varying material, which showed color change between red and yellow, with $T_A$ at 18° C., and $T_B$ at 32° C., whereby said body was maintained in red color at normal temperature.

The color of the body was changed to yellow after about 30 seconds from the start of energization of the above-explained device 1, and said color change was retained even after the termination of current supply.

When said body was rubbed with a brush impregnated with cold water (about 10° C.), the rubbed portion of the body was changed from yellow to red. Also when said body was entirely cooled to 18° C. or lower, the entire body was changed to red.

EXAMPLE 4 (FIGS. 5 to 16)

In the following explained is an embodiment of the electrothermal color-varying device 1 shown in FIG. 3, applied to a miniature car.

Figure 15:
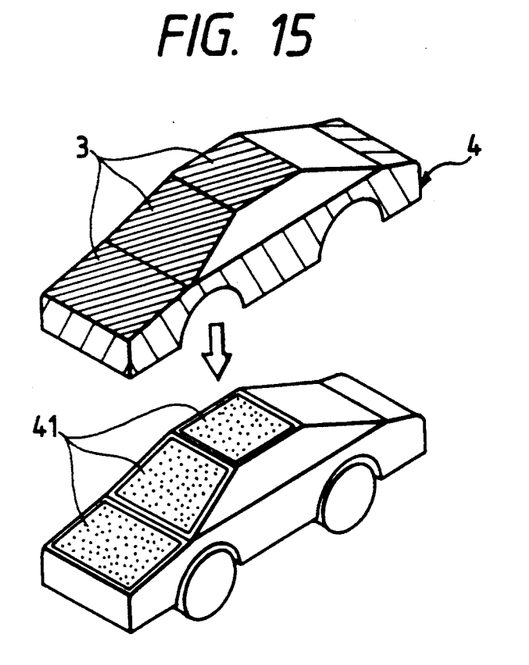
FIG. 15 is an exploded perspective view of a thermally color-varying miniature car.

In a hollow frame there were housed two UM3 batteries of 1.5 V, and heating elements, each consisting of a heat generating element 2 of sintered $BaTiO_3$ (7 mm in diameter, thickness 1 mm, 3 Ω, saturation temperature about 36° C.) and a heat-conductive member 41 of an aluminum plate of a thickness of 1 mm adhered with a conductive adhesive material, were mounted on the external surface of said frame, in positions corresponding to the engine hood, windows and roof of the miniature car, and were connected to said batteries through a switch.

A body 4 was formed with a polyvinyl chloride film of a thickness of about 0.3 mm, which was vacuum molded under heating to a suitable shape including contact faces with said heating elements.

On the front window of said body there was painted an image of driver, and said body was painted, excluding the windows, with ordinary yellow printing ink (non-color-varying layer 7).

On said layer 7, there was formed a thermal color-varying layer 3 by painting with a reversible thermal color-varying material which was red at a temperature lower than 37° C. but capable of changing to colorless at 37° C. or higher with ΔH of about 5° C.

Figure 16:
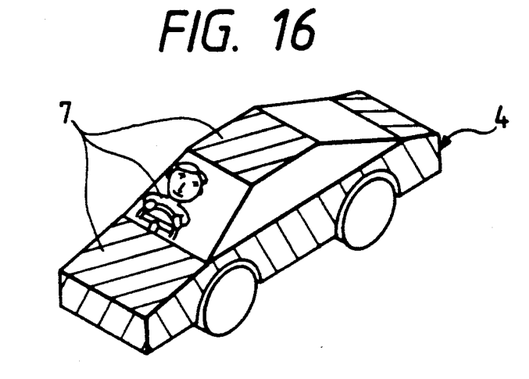
FIG. 16 is an external view of said miniature car after color change.

When said body 4 was mounted on the frame and the heat-generating elements 2 were energized, the body color was changed from red to yellow, and the image of the driver was simultaneously shown in the front window.

The above-mentioned resistance and characteristics of the heat-generating elements in the foregoing examples were obtained at 25° C.

EXAMPLE 5

In the following explained is an embodiment of the electrothermal color-varying device 1 shown in FIG. 4, applied to a toy robot.

Figure 6:
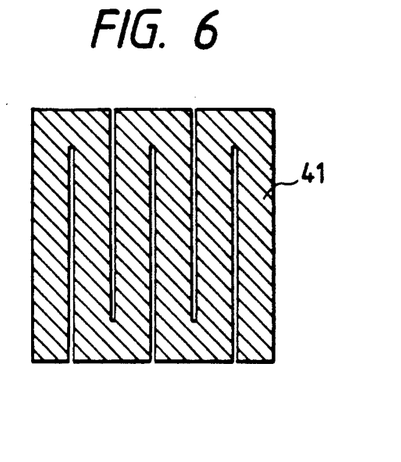
FIG. 6 is a plan view of a heat generating layer of FIG. 5.

In the belly part of a toy robot, there was suitably mounted an electrothermal color-varying device 1 consisting of an insulating substrate 4 bearing a thermal color-varying layer 3 thereon, an aluminum foil having slits in the form shown in FIG. 6 and positioned on the rear face of said substrate, and a heat-generating element 2 of sintered $BaTiO_3$ (15 mm in diameter, thickness 1 mm, 2.0 Ω, saturation temperature about 40° C.) laminated thereto. The power source was composed of two batteries of 1.5 V.

The top surface of said substrate 4 was printed with a pale-pink heat-shaped pattern (non-color-varying layer 7), which was covered by a material containing a thermal color-varying material which was dark blue at a temperature lower than 40° C. but capable of changing to colorless at 40° C. or higher, with a width of hysteresis of 5° C.

The belly of said toy robot was dark blue at room temperature, but showed a pale-pink heart pattern after about 30 seconds from the start of energization.

EXAMPLE 6

In the following explained is an embodiment of the electrothermal color-varying device 1 shown in FIG. 5, applied to a miniature car.

Figure 5:
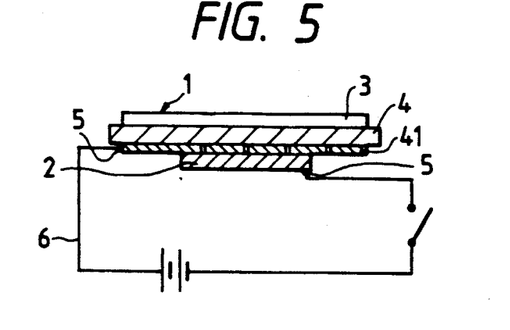

On a miniature car body made of polyvinyl chloride of a thickness of 0.3 mm, a metal foil heat-generating layer 41 shown in FIG. 5 was mounted corresponding to the engine hood portion, and an electrothermal heat-generating element of sintered $BaTiO_3$ (7 mm in diameter, thickness 1 mm, 3 Ω, saturated temperature about 36° C.) was formed on said heat-generating layer 41. These components were serially connected to a power source (about 3 V) through lead wires 6.

On said body was formed a thermal color-varying layer 3 by spray coating of paint containing a thermal color-varying material, which showed color change between red and yellow with $T_A$ at 18° C. and $T_B$ at 32° C., whereby said body was maintained in red color at normal temperature.

The color of said body was changed to yellow after about 30 seconds from the start of energization of said device 1, and said color change was retained even after the termination of current supply.

When said body was rubbed with a brush impregnated with cold water (about 10° C.), the rubbed portion of the body was changed from yellow to red. Also when said was entirely cooled to 18° C. or lower, the entire body was changed to red.

EXAMPLE 7 (FIG. 17 to 21)

Figure 18:
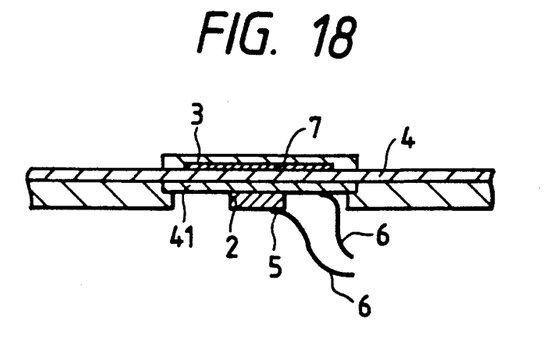
FIG. 18 is a schematic vertical cross-sectional view of an electrothermal color-varying mechanism in said doll.
Figure 19:
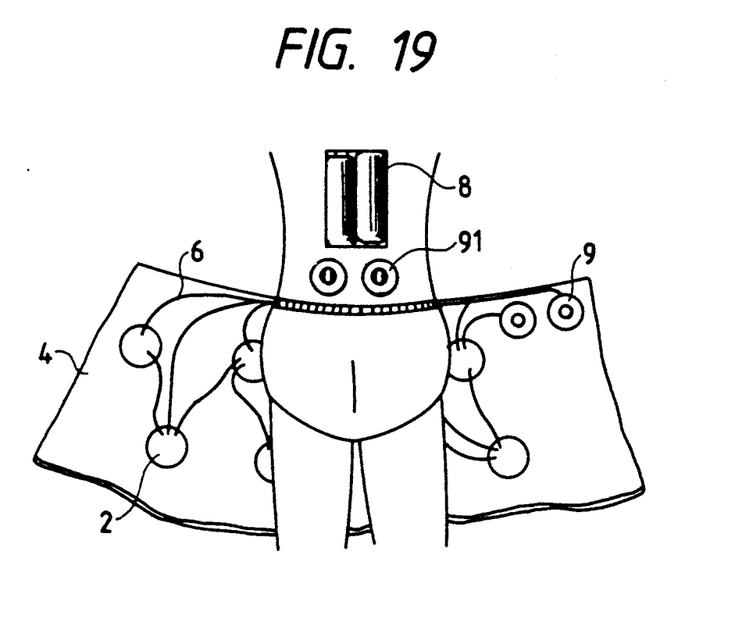
FIG. 19 is a schematic view showing arrangement of electrothermal heat-generating elements in said doll.
Figure 20:
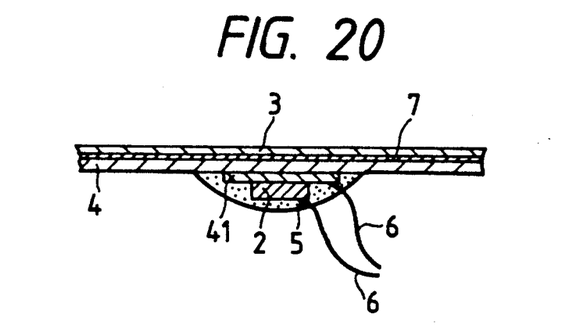
FIG. 20 is a cross-sectional view showing the mode of mounting of the electrothermal heat-generating element in FIG. 19.
Figure 21:
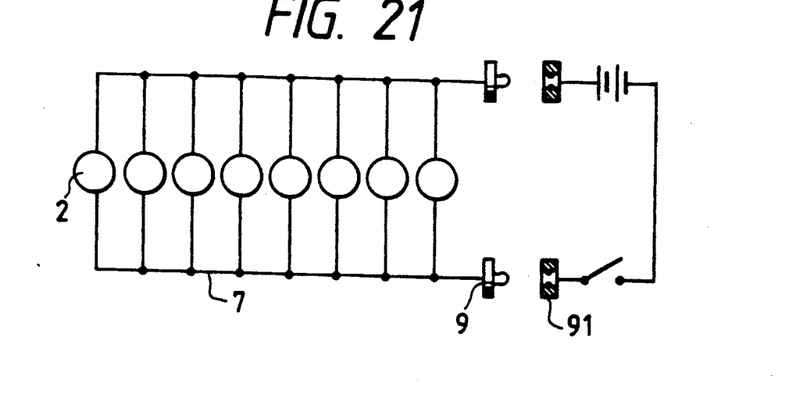
FIG. 21 is a circuit diagram of the electrothermal heat-generating elements in FIG. 20.
Figure 22:
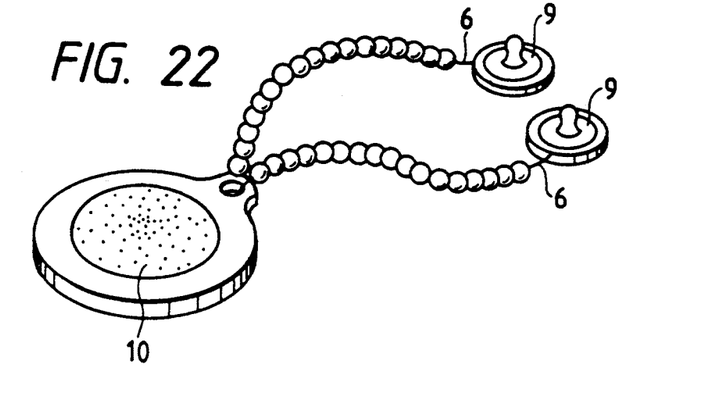
FIG. 22 is an external view of a toy accessory.
Figure 23:
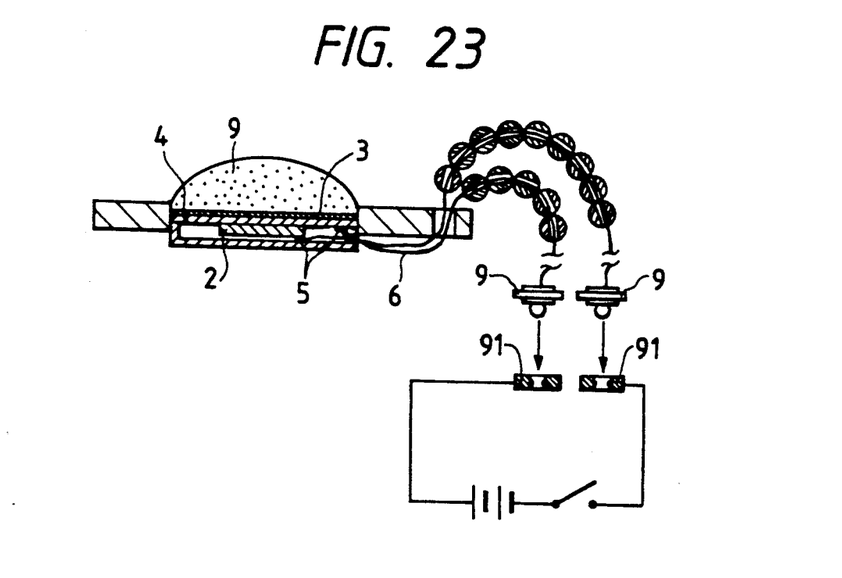
FIG. 23 is a schematic view of an electrothermal heat-generating mechanism of the toy accessory shown in FIG. 22.

In a recess (diameter about 5 cm), formed in chest portion of a doll molded with polyvinyl chloride resin, there was mounted a heating element, consisting of four sintered $BaTiO_3$ heat-generating elements 2 (7 mm in diameter, thickness 1 mm, 6.0 Ω at 25° C., saturation temperature about 45° C.) with conductive plated layers on both sides, adhered with suitable mutual spacing on a brass plate 4 of a thickness of 0.2 mm by means of a conductive adhesive material and connected electrically in parallel. Said heating element was connected with a power source 8, consisting of two batteries of 1.5 V, through lead wires 6 in such a manner that a switch (now shown) could be turned on and off by vertical movement of the arms of the doll.

On a shirt to be worn by said doll, there was printed a heart-shaped pattern with ordinary pink printing ink (non-color-varying layer 7), which was covered and hidden from visual observation by a circular thermal color-varying layer 3, printed with a material containing a thermal color-varying material, which was black at a temperature lower than 36° C. but capable of changing to colorless at 36° C. or higher, with $\Delta H$ of 3° C.

On the other hand, a blue fabric skirt 4 bore thereon a thermal color-varying layer 3, consisting of a material containing a thermal color-varying material which was pink at a temperature lower than 36° C. but capable of changing to colorless at 36° C. or higher, with $\Delta H$ of 5° C. Also on the rear side of said skirt there were mounted eight heating elements, each consisting of a sintered $BaTiO_3$ heat-generating element 2 with conductive plated layers on both sides (6 mm in diameter, thickness 1 mm, 6.0 Ω at 25° C., saturation temperature about 45° C.) mounted on an aluminum plate 4 of 10 mm in diameter × 0.2 mm, with suitable mutual distance (cf. FIGS. 19 to 21). These heating elements were connected by lead wires 6 to a pair of hooks serving as connection members 9, which can be engaged with connection members 91 provided on the body of the doll, whereby said elements can be energized by the power source 8 consisting of two batteries of 1.5 V, with on-off operation by the manipulation of arms.

A thermally color-varying doll was obtained by fitting said shirt and skirt on the doll body.

After about 20 seconds (ambient temperature 25° C.) from the start of energization by the actuation of the arms, the circular black covering pattern on the shirt disappeared to reveal the pink heart-shaped pattern 11. Also on the skirt there appeared eight circular blue patterns. The surface temperature of the aluminum plate 41 of the above-mentioned heating elements elevated to about 50° C. at maximum, and remained around this value.

The above-mentioned aspects obtained by thermal color changes were retained during the current supply, and the original aspects were restored soon after the opening of the switch by returning of the arms to the original position.

As explained in the foregoing, the electro-thermal color-varying device of the present invention can achieve color change in the thermal color-varying layer by rapid heat generation to a predetermined temperature in the electrothermal heat-generating layer through the application of a low voltage, and is free from the danger of overheating since said heat generation can be self-controlled to an arbitrary saturation temperature not exceeding 65° C.

Besides, said device is free from the danger of current leakage and does not require the insulation for the heater, as it is based on an electrothermal system utilizing a low voltage. Various commercially available batteries can be utilized as the power source. Said device can therefore be utilized in various toys incorporating dry battery, toys that can be remote controlled through lead wires, teaching aids provided with electrothermal heat-generating elements behind thermally color-varying teaching elements that appear and disappear by thermal color change, or a thermally color-varying writing board provided with electrothermal heat-generating elements behind a thermally color-varying writing plate.

What is claimed is:

1. A toy formed of a substrate and comprising an electrothermal color-varying device and a thermally color-varying layer comprising a thermally color-varying material, said color-varying material comprising a composition of an electron-donating color forming organic compound, an electron-accepting compound and an organic medium reversibly inducing a color developing reaction of said two compounds; said electrothermal color varying device comprising an electrothermal heat generating member comprising a sintered material based on $BaTiO_3$ and having a flat front surface and an opposed back surface, the electrothermal heat generating member being formed with electrodes at said front and back surfaces and being positioned with said front surface in close contact with a back surface of the toy substrate, wherein color change is induced in said color-varying layer by electric current supply to said heat-generating member, i) a positive temperature coefficient on the electric resistance at least within a temperature range of 25° C. to 65° C., and a steep increase of resistance with increase in temperature, whereby the amount of generated heat decreases with the increase in resistance to enable self-control of temperature, ii) a volume resistivity at 25° C. ($\rho_{25}$) within a range of $9.8 \times 10^{-3}$ to $2.97 \times 10^5 \times$ Ω-cm; and iii) a ratio $\rho_{65}/\rho_{25}$ of the volume resistivity at 65° C. to that at 25° C. within a range indicated by $5 \leq \rho_{65}/\rho_{25} \leq 200$, which is adapted to generate heat by the application of a voltage of 0.8 to 40 V, and of which saturated heating temperature is self-controlled at an arbitrary temperature within a range of 25° C. to 65° C.

2. The toy according to claim 1, wherein the front surface of said electrothermal heat generating member contacts a heat-conductive sheet member positioned in close contact with the back surface of said substrate.

3. A toy according to claims 1 or 2 wherein the toy is a doll or animal toy, or an accessory for a doll or animal toy.

4. A toy according to claims 1 or 2 wherein the toy is a transportation vehicle toy.

5. A toy according to claims 1 or 2 wherein the toy is an educational toy.

* * * * *

UNITED STATES PATENT AND TRADEMARK OFFICE
CERTIFICATE OF CORRECTION

PATENT NO. : 5,316,513

DATED : May 31, 1994

INVENTOR(S) : TANEHIRO NAKAGAWA, ET AL.

It is certified that error appears in the above-identified patent and that said Letters Patent is hereby corrected as shown below:

COLUMN 1

Line 5, "continuation-in-part" should be deleted.

COLUMN 4

Line 16, "0.8 -40 V." should read --0.8-40 V.--.

COLUMN 5

Line 36, "in contact with" should be deleted.

COLUMN 6

Line 38, "afore-mentioned" should read --aforementioned--.

COLUMN 7

Line 3, "eys" should read --eyes--.

COLUMN 9

Line 14, "said" should read --said body--.

UNITED STATES PATENT AND TRADEMARK OFFICE
CERTIFICATE OF CORRECTION

PATENT NO. : 5,316,513
DATED : May 31, 1994
INVENTOR(S) : TANEHIRO NAKAGAWA, ET AL.

It is certified that error appears in the above-identified patent and that said Letters Patent is hereby corrected as shown below:

COLUMN 10

Line 40, "color varying" should read --color-varying--.
Line 49, "member," should read --member, ¶ wherein said electrothermal heat-generating member has:--.

Signed and Sealed this

Sixth Day of December, 1994

Attest:

BRUCE LEHMAN

*Attesting Officer*     *Commissioner of Patents and Trademarks*